United States Patent
Nagao et al.

(10) Patent No.: US 10,967,833 B1
(45) Date of Patent: Apr. 6, 2021

(54) VEHICLE MONITORING SYSTEM USING MULTIPLE SECURITY CAMERAS

(71) Applicant: Denso International America, Inc., Southfield, MI (US)

(72) Inventors: Satoshi Nagao, Bellevue, WA (US); Yohsuke Satoh, Bellevue, WA (US); Masashi Nakagawa, Sunnyvale, CA (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/843,311

(22) Filed: Apr. 8, 2020

(51) Int. Cl.
| | |
|---|---|
| *B60R 25/10* | (2013.01) |
| *B60R 25/102* | (2013.01) |
| *B60R 25/30* | (2013.01) |
| *H04W 4/46* | (2018.01) |
| *B60R 25/33* | (2013.01) |

(52) U.S. Cl.
CPC ........ *B60R 25/1012* (2013.01); *B60R 25/102* (2013.01); *B60R 25/305* (2013.01); *B60R 25/33* (2013.01); *H04W 4/46* (2018.02); *B60R 2300/105* (2013.01); *B60R 2300/8073* (2013.01); *B60R 2325/10* (2013.01)

(58) Field of Classification Search
None
See application file for complete search history.

(56) References Cited

U.S. PATENT DOCUMENTS

| | | | |
|---|---|---|---|
| 8,781,169 B2 | 7/2014 | Jackson et al. | |
| 9,761,135 B2 | 9/2017 | Chen et al. | |
| 10,244,365 B2 | 3/2019 | Meredith et al. | |
| 10,252,701 B2 | 4/2019 | Chuang et al. | |
| 10,395,332 B1 | 8/2019 | Konrardy et al. | |
| 2004/0082350 A1* | 4/2004 | Chen ................. | H04W 12/1206 455/518 |
| 2008/0079551 A1* | 4/2008 | Blanchet ............... | B60R 25/102 340/426.1 |
| 2009/0287412 A1* | 11/2009 | Menzel ................. | G01C 21/36 701/117 |
| 2018/0091252 A1* | 3/2018 | Hayman ................ | H04K 3/222 |
| 2018/0218582 A1 | 8/2018 | Hodge et al. | |
| 2019/0236379 A1 | 8/2019 | Golov et al. | |
| 2019/0256045 A1* | 8/2019 | Siaka .................... | B60R 25/403 |

* cited by examiner

*Primary Examiner* — Brent Swarthout
(74) *Attorney, Agent, or Firm* — Christopher G. Darrow; Darrow Mustafa PC (57) ABSTRACT

Systems and methods are provided for monitoring a group of vehicles for suspicious activity. The method includes grouping a plurality of vehicles in communication with a network to collectively monitor and detect evidence of theft or unauthorized intrusion using existing theft detection sensors located in the plurality of vehicles. One of the plurality of vehicles is designated as a master vehicle responsible for managing at least one control feature, and is operably coupled to the network and at least one processor. At least one input from at least one theft detection sensor of the plurality of vehicles is obtained and analyzed for suspicious information. The method includes determining that the input represents or contains evidence indicative of a theft or unauthorized intrusion. A communication is then provided to at least one of another vehicle, a vehicle owner, and the network indicating a potential theft or unauthorized intrusion.

19 Claims, 4 Drawing Sheets

VEHICLE MONITORING SYSTEM USING MULTIPLE SECURITY CAMERAS

TECHNICAL FIELD

The present disclosure generally relates to communicating information between vehicles and, more particularly, to forming a network of vehicles for monitoring an area for security issues, such as potential theft and vandalism, with one of the vehicles designated to control the operations.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicles, when not in use, may be parked in a lot or structure where temporary parking is allowed. In some cases, the parking lot or structure may be monitored for safety and other considerations. In many other cases, the parking lot or structure is not monitored. Although unfortunate, incidents such as vehicle thefts, vandalism, and unauthorized intrusions into vehicles may occur. While it may not be possible to fully prevent such acts, it remains desirable to be able to provide increased preventative and/or vehicle safety and security assurances.

Accordingly, it would be desirable to utilize existing vehicle sensors in order to provide improved detection and vehicle monitoring systems that have a high rate of success of identifying suspicious activity while it occurs, but yet does not as heavily rely on parking lot or structure security systems.

SUMMARY

This section provides a general summary of the disclosure, and is not a comprehensive disclosure of its full scope or all of its features.

In various aspects, the present technology provides a coordinated system of monitoring a group of vehicles for suspicious activity. The system includes a network in communication with a plurality of vehicles and configured to monitor and detect evidence of theft or unauthorized intrusion using existing theft detection sensors located in the plurality of vehicles. One of the plurality of vehicles is designated as a master vehicle, responsible for managing at least one control feature in the coordinated system. The system includes at least one processor operably connected to the network and the master vehicle, and a memory device operably connected to the at least one processor. The memory device includes a detection module having instructions that, when executed by the at least one processor, cause the at least one processor to obtain at least one input from at least one theft detection sensor of the plurality of vehicles. The memory device also includes a theft determination module having instructions that, when executed by the at least one processor, cause the at least one processor to: (1) analyze the input from the at least one theft detection sensor for suspicious information; and (2) determine that the input represents or contains evidence indicative of a theft or unauthorized intrusion into one of the plurality of vehicles. Still further, the memory device includes a communication module having instructions that, when executed by the at least one processor, cause the at least one processor to, upon receiving a notification indicative of a theft or unauthorized intrusion from the theft determination module, provide a communication to at least one of another vehicle, a vehicle owner, and the network. The communication may indicate that one of the plurality of vehicles may have been subjected to a theft or unauthorized intrusion. In other aspects, the present technology provides a computer-implemented method of monitoring a group of vehicles for suspicious activity. The method includes grouping a plurality of vehicles in communication with a network to collectively monitor and detect evidence of theft or unauthorized intrusion using existing theft detection sensors located in the plurality of vehicles. The method includes designating one of the plurality of vehicles as a master vehicle responsible for managing at least one control feature. The master vehicle is operably coupled to the network and at least one processor. The method includes obtaining at least one input from at least one theft detection sensor of the plurality of vehicles. The input from the at least one theft detection sensor is then analyzed for suspicious information. The method includes determining that the input represents or contains evidence indicative of a theft or unauthorized intrusion into one of the plurality of vehicles. A communication is then provided to at least one of another vehicle, a vehicle owner, and the network, with the communication indicating that one of the plurality of vehicles may have been subjected to a theft or unauthorized intrusion.

In still other aspects, the present technology provides that the described methods and/or their equivalents may be implemented with computer-executable instructions. Thus, in various embodiments, a non-transitory computer-readable medium may be configured with stored computer-executable instructions that when executed by a machine (e.g., processor, computer, and so on) cause the machine (and/or associated components) to perform the methods described herein.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The present technology provides systems and methods for monitoring a group of vehicles for suspicious activity. The method includes grouping a plurality of vehicles in communication with a network to collectively monitor and detect evidence of theft or unauthorized intrusion using existing theft detection sensors located in the plurality of vehicles. One of the plurality of vehicles is designated as a master vehicle responsible for managing at least one control feature, and is operably coupled to the network and at least one processor. This designation may rotate among vehicles of the group. At least one input from at least one theft detection sensor of the plurality of vehicles is obtained and analyzed for suspicious information. The method includes determining that the input represents or contains evidence indicative of a theft or unauthorized intrusion. A communication is ultimately provided to at least one of another vehicle, a vehicle owner, and the network indicating a potential theft or unauthorized intrusion.

Figure 1:
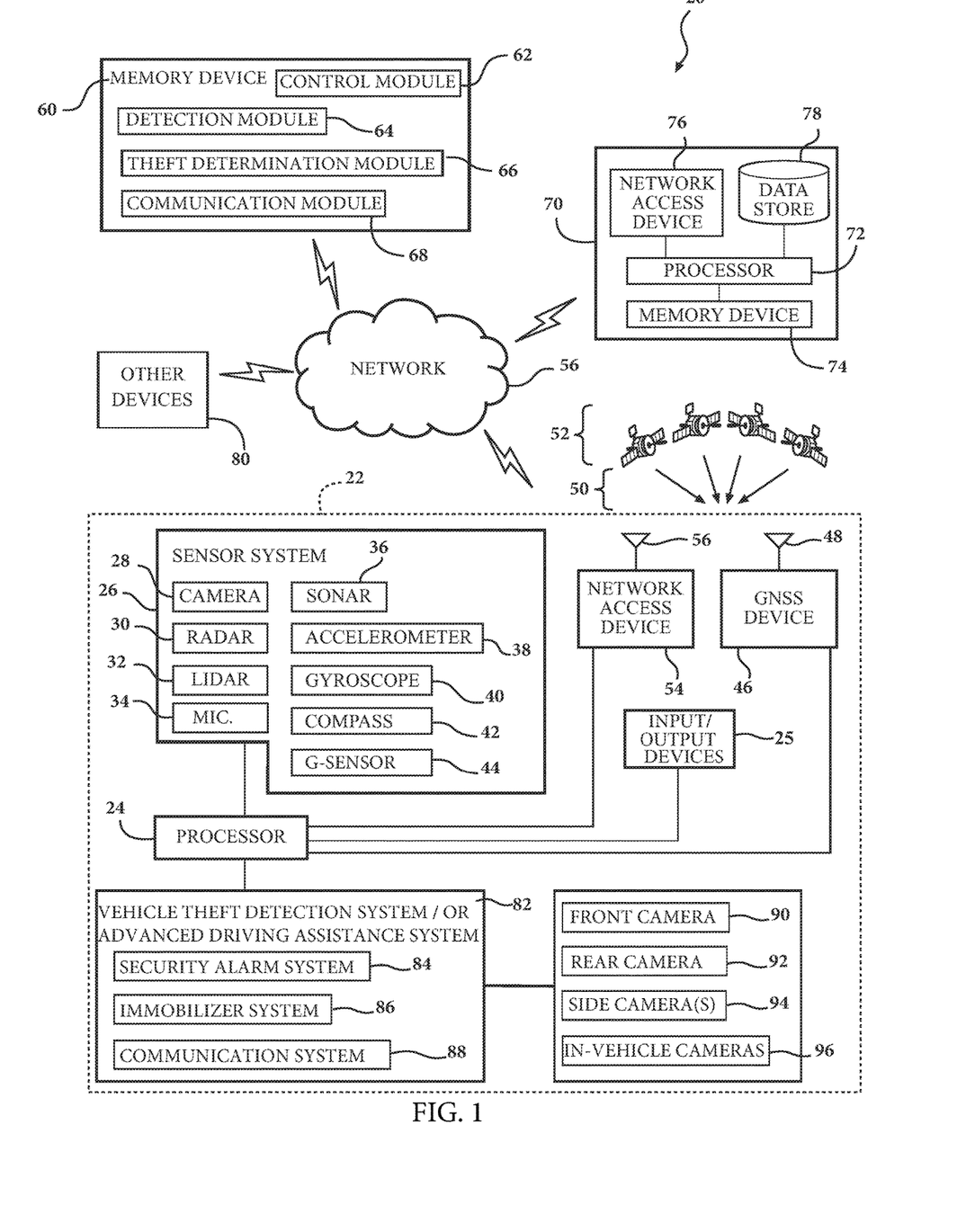
FIG. 1 illustrates a general schematic view of various systems provided for monitoring a group of vehicles for suspicious activity according to various aspects of the present technology.

FIG. 1 is a schematic view of one exemplary coordinated monitoring system 20 according to various aspects of the present technology. In operation, the coordinated monitoring system 20 includes a plurality of vehicles, with many having at least one vehicle system 22 including a processor 24. The processor 24 may be a single processor or may be multiple processors working in concert. One or more of the processors may be physically located within a particular vehicle system 22 or may be located outside of the vehicle system 22 in a distributed fashion, but in communication with one another. As should be understood, the communications between processors, components, and vehicles can be any communication systems, known or yet to be discovered, which can be used with the present technology. By way of example, recent advances provide vehicles with connected systems that communicate with personal mobile phones and devices, other vehicles/infrastructures, as well as networks and remote cloud systems. A sensor system 26 may be provided, including one or more sensors for sensing and monitoring the environment located around the plurality of vehicles. Additional input/output devices 25 may also be used.

As shown in FIG. 1, the exemplary sensor system 26 may include one or more image and/or video cameras 28, a radar sensor 30, a LIDAR (Light Detection and Ranging) sensor 32, a microphone 34, and a sonar sensor 36. These types of sensors, as well as other known sensors, may be capable of sensing the environment and gathering relevant information surrounding one or more vehicles that can be analyzed for suspicious activity as described herein. It should be understood that this particular sensor system 26 is but one example of a sensor system, and different types and/or combinations of sensors may be utilized, in addition to those specifically described.

In one example, the camera 28 may be utilized to capture images and/or video of the surroundings and may provide this information to the processor 24, where the processor 24 coordinates with various systems, modules, and other processors, which may include artificial intelligence features, in order to extract input and analyze the input to obtain various information. Input and data from various cameras described herein may be still images or previously recorded video, as well as live images or continuous feed.

The radar sensor 30 and/or the sonar sensor 36 may locate objects by receiving an echo of a signal that is bounced off one or more objects. The LIDAR sensor 32 utilizes reflected light that is reflected from one or more objects. Depending on the size, shape, and other identifying information, the radar sensor 30, the sonar sensor 36, and/or the LIDAR sensor 32 may be able to extract various information from detected objects, such as other vehicles, people, and their respective locations and subsequent changes in location, that can be used to assess whether or not certain activity may be considered inappropriate, potentially leading to a conclusion that a theft or intrusion may be taking place.

In addition to these sensors, the sensor system 26 may also include other sensors, such as an accelerometer 38, a gyroscope 40, a compass 42, and a G-sensor 44. Such sensors may be utilized as is known in the art to determine a movement of a vehicle or a force/shock applied to a vehicle. For example, input/data that falls within a range of values may indicate suspicious activity that could suggest a need for additional monitoring, or indicate that there has been an incident with respect to potential theft, vandalism, or unusual activity in the vehicle, where immediate monitoring would be beneficial.

The vehicle system 22 may also include a Global Navigation Satellite System (GNSS) device 46, which may be in communication with an antenna 48. The GNSS device 46 may be a satellite navigation system that provides autonomous geo-spatial positioning with global coverage. The GNSS device 46 may include any one of several different GNSS systems, such as GPS (Global Positioning System), GLONASS (Globalnaya Navigatsionnaya Sputnikovaya Sistema), Galileo, Beidou, or other regional systems. The GNSS device 46 may be connected to an antenna 48 that is capable of receiving one or more signals 50 from one or more satellites 52. Based on the one or more signals 50 from one or more satellites 52, the GNSS device 46 may determine the relative location of the vehicle system 22. This relative location may be in the form of a coordinate system that may indicate the latitude, longitude, and/or altitude of a vehicle, or any other type of system, that has the GNSS device 46 installed within.

The vehicle system 22 may also include a network access device 54 that is in communication with the processor 24. The network access device 54, which may be in communication with an antenna 56, may be an electronic circuit that connects, either automatically or manually, the processor 24 to a network 58. The network access device 54 may be in communication with the processor 24 using one of a variety of different networks and/or communication protocols. Examples may include a controller area network (CAN), local area network (LAN), media orientated systems transport (MOST), or any other network capable of providing an electronic communication pathway between the network access device 54 and the processor 24.

The network access device 54 allows the vehicle system 22 and, therefore, the processor 24 to communicate with one or more devices that are connected or in communication with a network 58. The network 58 may be a distributed network such as the Internet, cloud-computing device, or any other device that may be in communication with the network 58. The network access device 54 may be in communication with the network 58 via the use of an antenna 56 that is in communication with the network access device 54. In one example, the antenna 56 may be a cellular antenna configured to connect with one or more cellular networks, such as analog cellular networks and/or digital cellular networks, such as 2G, 3G, 4G, 5G networks and future iterations thereof. The antenna 56 may also be other types of antennas or combinations thereof, such as antennas that are configured to connect with Wi-Fi networks (IEEE 802.1X), Bluetooth networks, and/or V2X networks such as V2V, V2C, V2I, and combinations thereof. The network access device 54 allows the vehicle system 22 to communicate with other devices to perform any one of several different functions described herein.

The vehicle system 22 may also include a memory device 60 for storing digital information that is either utilized or generated by one or more processor 24. The memory device 60 may be any type of memory device capable of storing information, such as a solid-state memory device, magnetic storage device, optical storage device, and the like. It should be understood that the memory device 60 may be multiple different memory devices of the same or even different types distributed throughout the vehicle system 22 or even distributed outside the vehicle system 22. In addition, the memory device 60 may be integrated within one or more processor 24 or may be separate from the processor 24 (as shown).

In this example of FIG. 1, the memory device 60 includes a control module 62, detection module 64, a theft determination module 66, and a communication module 68. Each of the modules 62, 64, 66, and/or 68 may contain instructions that cause the processor 24 to perform any one of several different tasks, operations, and methodologies disclosed in this specification.

The vehicle system 22 may also communicate with other types of systems, such as a central server 70 that is capable of collecting various inputs and information regarding the monitoring of vehicles, including the collection of data, controlling modules, performing analysis and determination features, and coordinating communications. For example, the central server 70 may include its own processor 72 in communication with a memory device 74 and a network access device 76. The network access device 76 allows the central server 70 to communicate with the network 58 and, therefore, the vehicle system 22. In addition, the central server 70 may include a data store 78. The data store 78 is, in one embodiment, an electronic data structure, such as a database, that is stored in the memory device 74 or another memory and that is configured with routines that may be executed by the processor 72 for analyzing stored data, providing stored data, organizing stored data, and so on.

The central server 70 may receive information regarding the vehicle monitoring from the vehicle system 22 and other systems and other devices 80 working together in the coordinated systems. Various portions, features, or aspects of the vehicle system 22 can also be found in numerous other devices, such as other remote vehicles and/or other devices 80, such as mobile phones, tablet devices, notebook computers, and the like. The central server 70 may collect information from the vehicle system 22 and other related systems regarding the vehicle monitoring. Based on this collected information, the central server 70 may be able to use crowdsourcing type technology and may be provided with machine learning capabilities.

The vehicle system 22 may include a vehicle theft detection system or an advanced driving assistance system 82, which may be part of an existing vehicle alarm system, parking system, or the like. In various aspects, the vehicle theft detection system or an advanced driving assistance system 82 can include a security alarm system 84, a vehicle immobilizer system 86, and a communication system 88. The security alarm system may be configured to, for example, detect unauthorized entry into the vehicle, unauthorized use of the vehicle, attempts to obtain access to the vehicle, and the like. The security alarm system 84 may be configured to use any of the sensors of the sensor system 26, discussed above, as well as use dedicated security cameras. For example, the vehicle theft detection system or an advanced driving assistance system may be in communication with one or more of a front camera 90, a rear camera 92, side cameras 94 and in-vehicle cameras 96. Each of the cameras 90, 92, 94, 96 may provide a different field of view, as well as have a different viewing angle, focal length, zoom capability, and the like. In certain aspects, the views may be combined into 180 degree and even 360 degree views.

The vehicles useful with the present technology may take any one of several different forms. In various examples, the vehicles are shown to be passenger automobiles. However, it should be understood that the vehicles and groups of vehicles may include other types of vehicles, such as trucks, commercial vehicles, sport utility vehicles, heavy-duty trucks, emergency vehicles, mining vehicles, agricultural vehicles, military vehicles, landscaping vehicles, construction vehicles, single passenger vehicles such as motorized bikes, and the like. Moreover, the vehicles could be any type of vehicle that is capable of transporting persons and/or objects from one location to another. Furthermore, it should be understood that the vehicles may not be limited to land-based vehicles but could also include other types of vehicles as well, such as boats and vessels docked in a harbor, and aircrafts parked in a hanger.

One or more of the vehicles may be autonomous vehicle. An autonomous vehicle may be a vehicle that requires little to no human intervention to properly operate the vehicle. Conversely, one or more of the vehicles may be a non-autonomous vehicle that requires human input to operate the vehicle properly. Further still, the vehicles may have multiple modes of operation and may be able to function as both an autonomous vehicle in one mode and a non-autonomous vehicle in another mode, or combination thereof.

Figure 2:
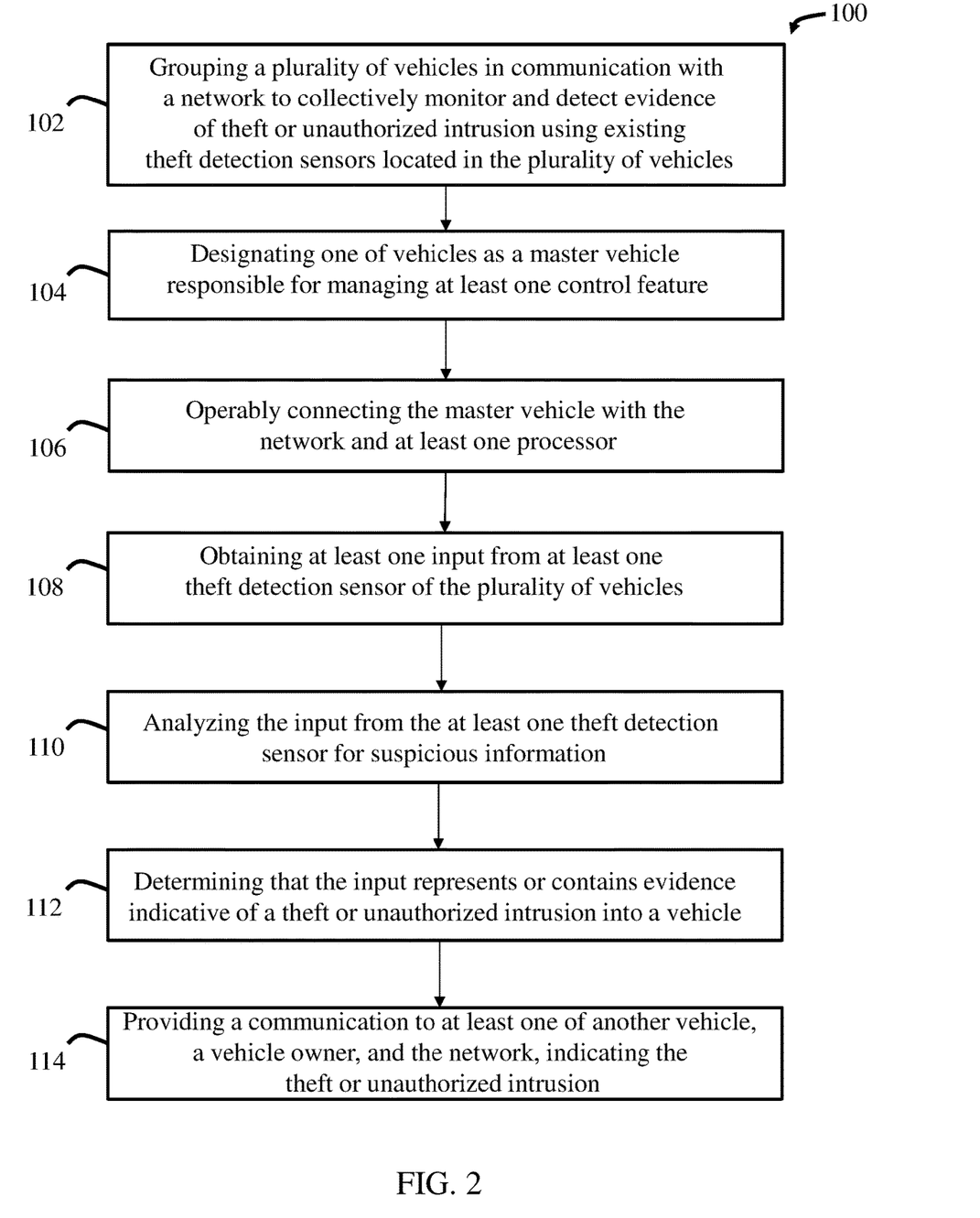
FIG. 2 illustrates an exemplary flow diagram for various methods of monitoring a group of vehicles for suspicious activity according to various aspects.

FIG. 2 provides one example of a computer-implemented method 100 of monitoring a group of vehicles for suspicious activity. It should be understood that additional steps may be included that are not necessarily provided in FIG. 2, and certain steps may repeat and/or occur in different orders. As indicated by method box 102, in various aspects, the method may begin by grouping a plurality of vehicles together in communication with a network 58 in order to collectively monitor and detect evidence of theft or unauthorized intrusion. In various aspects, the participation is voluntary, and there may or may not be a service fee for being able to participate. It is envisioned that each of the plurality of vehicles may be able to actively participate and contribute to various aspects and features of the methods of the coordinated systems in some manner. A grouping of a plurality of vehicles can be made at any time. In certain aspects, the grouping may be made and/or updated at specific times or intervals, and may be based on a predetermined schedule. The grouping may be modified if additional vehicles enter a parking area, or existing vehicles exit the parking area. The vehicles may communicate their movement, or the movement can be detected by other means, including using dedicated cameras and sensors affiliated with a parking area. In various aspects, a grouping may be made, passively waiting for any suspicious activity. In other aspects, the grouping may be made at the first detection of movement or of suspicious activity. Various systems and sensors of the systems described herein may be placed in a non-active or passive mode at certain times when there is no detected activity in the parking area.

In various aspects, the plurality of vehicles may be located in a parking lot or a parking structure. In other aspects, the plurality of vehicles may include a number of vehicles in close proximity in a residential neighborhood, or on a residential street. It is envisioned that the methods of the present technology may be able to use existing theft detection systems 82 and their respective theft detection sensors already located in one or more of the plurality of vehicles participating in the system. Of course, the technology may also include other sensors available in various environments, such as parking lot cameras, street cameras, and even residential use cameras, to the extent they are capable of detecting activity near the vehicles of the group. In one example, referring to FIG. 1, the control module 62 may include instructions that cause the processor 24 to gather information from various vehicles in a parking lot that want to participate in the group monitoring.

With reference to method step 104, in various aspects, the method includes designating one of the plurality of vehicles as a master vehicle responsible for managing at least one control feature, including communicating with other vehicles. As indicated by method step 106, the master vehicle should be a vehicle that is able to be operably coupled to the network and at least one processor, and that has certain minimum equipment necessary for completing the various required functions in order to control different features of the present technology. In various aspects, the designation of one of the plurality of vehicles in a group as the master vehicle may be made remotely, selected based on various conditions, and may be based on a rotating schedule. In other aspects, the determination may be made by communications between a group of vehicles in close proximity and in communication with one another.

The control module 62 may also cause the processor 24 to instruct a master vehicle to communicate with the various vehicles and vehicle systems 22 that are in communication with the network 58. The other vehicles in the grouping may also communicate directly with the network 58, and vice-versa. Since the master vehicle may need to provide various communications, and use certain resources that may require a certain allocation of energy or power, it may be beneficial to let certain vehicles alternate having a responsibility of being the master vehicle. For example, in various aspects, the systems and methods of the present technology may use a time plan, or a similar feature, to coordinate a rotation of the responsibilities of being a master vehicle between different vehicles in a grouping. It should be understood that certain vehicles may not have the necessary sensors or equipment to serve as the master vehicle. In other aspects, certain vehicles may have the equipment, but may not be able to contribute to monitoring. For example, a vehicle may have its camera sensor(s) covered in snow. Thus, the present technology provides that in certain aspects, a vehicle that cannot contribute to monitoring may be required to pay a certain compensation, monetary or other types of debit, in order to participate in the coordinated monitoring system. In this regard, where one or more vehicles take on additional responsibility of being the master vehicle, the systems may be organized so that the owners of the master vehicles receive a compensation, monetary or other types of credits, for the time and resources used managing the various monitoring in the coordinated system.

With reference to method step 108 of FIG. 2, the methods may include obtaining at least one input from at least one theft detection system or sensor from the plurality of vehicles. In one example, the detection module 64 includes instructions that cause the processor 24 to capture input from one or more sensors making up the sensor system 26 of different vehicles. This may also include obtaining input from at least one sensor from a vehicle theft detection system or an advanced driving assistance system 82, such as a camera 90, 92, 94, 96. Input may include still images, live stream video, or a recorded video clip. These captured inputs may be stored within the memory device 60 or elsewhere. In various aspects, the master vehicle may be able to coordinate with various detection modules 64 in order to initially obtain information that indicates the different types of sensors that may be available from each of the plurality of vehicles. For example, certain vehicles may have different sensors and different types of monitoring capabilities. This information may be sent to the network 58, as well as other systems and vehicles, to better coordinate the collective monitoring efforts. The master vehicle may then ultimately coordinate the monitoring efforts based on the different types of sensors that are available at any given time from each of the plurality of vehicles, and any other sensors from the parking area, and the like. In various aspects, the master vehicle may work in coordination with the detection modules 64 to coordinate operations of the theft detection systems and sensors to capture image data, video data, and other sensor input from each of the plurality of vehicles. The coordination may be based on a monitoring schedule. The monitoring schedule may be controlled by the master vehicle, which may obtain its instructions from the network 58, or other systems that may assist in coordination efforts. The monitoring schedule may be a rotation schedule, and may be based, for example, on a size of the monitoring area, which may be commensurate with a size of the parking area; a monitoring pattern; and a total number of vehicles in the plurality of vehicles that are participating in the coordinated monitoring system, as well as their relative location.

With reference to method step 110 of FIG. 2, the various inputs from the at least one theft detection sensor is then analyzed for suspicious information. In one example, the theft determination module 66 includes instructions that cause the processor 24 to analyze input from at least one theft detection sensor for suspicious information, and make or assist with a determination of whether the input represents or contains evidence indicative of a theft or unauthorized intrusion. In certain instances, movement by a person may be detected that is not related to suspicious activity, thus should be ignored. In other instances, movement may warrant further consideration and monitoring. In various instances, machine learning may be used with existing technology in order to analyze various input and to make a determination of whether the input represents or contains evidence indicative of a theft or unauthorized intrusion into one of the plurality of vehicles. The determination of whether something is to be considered suspicious activity may vary based on many considerations as should be understood to those of ordinary skill in the art.

Once it is determined that suspicious activity has been detected, as referenced by method step 112, the master vehicle may coordinate further monitoring, or request certain vehicles to actively capture data, for example, obtain still images or record video, or even transfer live stream video or a recorded video clip that can ultimately be provided to an owner of a vehicle that may be the subject of suspicious activity. In various aspects, the vehicle that is the subject of a theft or intrusion can directly send input, data, and communication to the master vehicle and/or network 58.

With reference to method step 114, in various aspects, the master vehicle and/or network 58 may coordinate with a communication module 68. For example, a communication may be provided to at least one of another vehicle, a vehicle owner, and the network 58, with the communication indicating that one of the plurality of vehicles may have been subjected to a theft or unauthorized intrusion. Communications can also be provided to management of the parking area, as well as directly to police or law enforcement. In various aspects, communications provided by the communication module may include at least one of a map and GPS coordinates indicating a location of the theft or unauthorized intrusion.

Figure 3A:
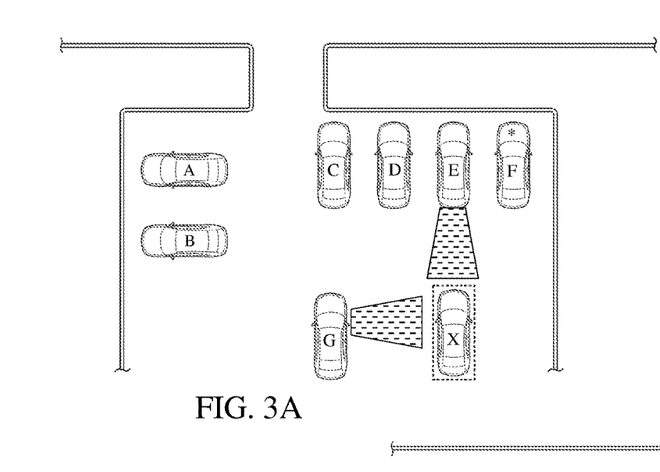
FIGS. 3A-3C provide a series of illustrations of an exemplary parking lot with a plurality of vehicles participating in the coordinated monitoring according to various aspects of the present technology.
Figure 3B:
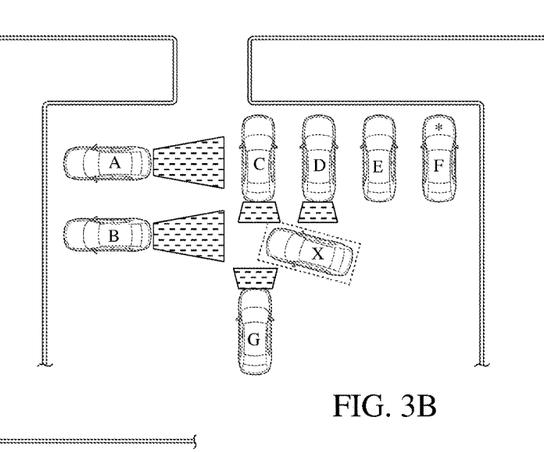
Figure 3C:
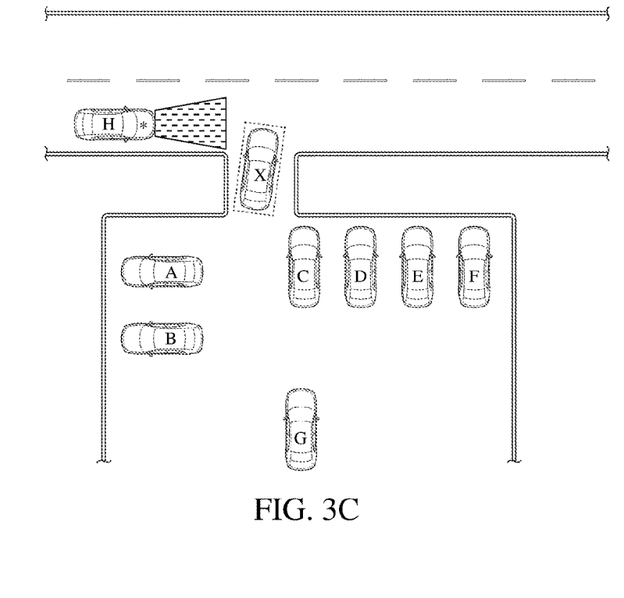

FIGS. 3A-3C provide a series of illustrations of an exemplary parking lot with a plurality of vehicles A, B, C, D, E, F, G, and X participating in the coordinated monitoring according to various aspects of the present technology. For purposes of the illustration, vehicle X is a vehicle that is subjected to a theft/unauthorized intrusion; the master vehicle is designated with an asterisk "*". As shown in FIG. 3A, vehicles E and G provide a direct line of sight with vehicle X. As such, the master vehicle, vehicle F, may coordinate a request to vehicle E to capture data from a rear camera, and request vehicle G to capture data from a passenger side camera. The trapezoidal shapes adjacent the various vehicles indicate a direction of monitoring.

As data is obtained and further analyzed, it may be determined the vehicle X is now moving from its parking spot, and throughout the parking area, as is shown in the illustration provided in FIG. 3B. Thus, the various processors, systems, and modules may now determine a need to modify the coordination of inputs, and for the master vehicle F instruct the same. In this specific example, vehicles A, B, C, and D may each be requested to obtain and provide input from their rear cameras, while vehicle G is requested to change the sensor from the side camera view to the front camera view.

As the stolen vehicle X approaches an exit of the parking area, it may be possible to send an alert or communication to other vehicles that may be in the surrounding area, but are not necessarily a member of the plurality of vehicles participating in the coordinated monitoring system. FIG. 3C illustrates a situation where the stolen vehicle X exits the parking area, and is now adjacent another vehicle on the adjacent street, vehicle H. If vehicle H is properly equipped with sensors and appropriate communication, it may be possible to transfer master vehicle duties to vehicle H, so that additionally monitoring may continue as the stolen vehicle X continues an attempt to drive off.

Figure 4:
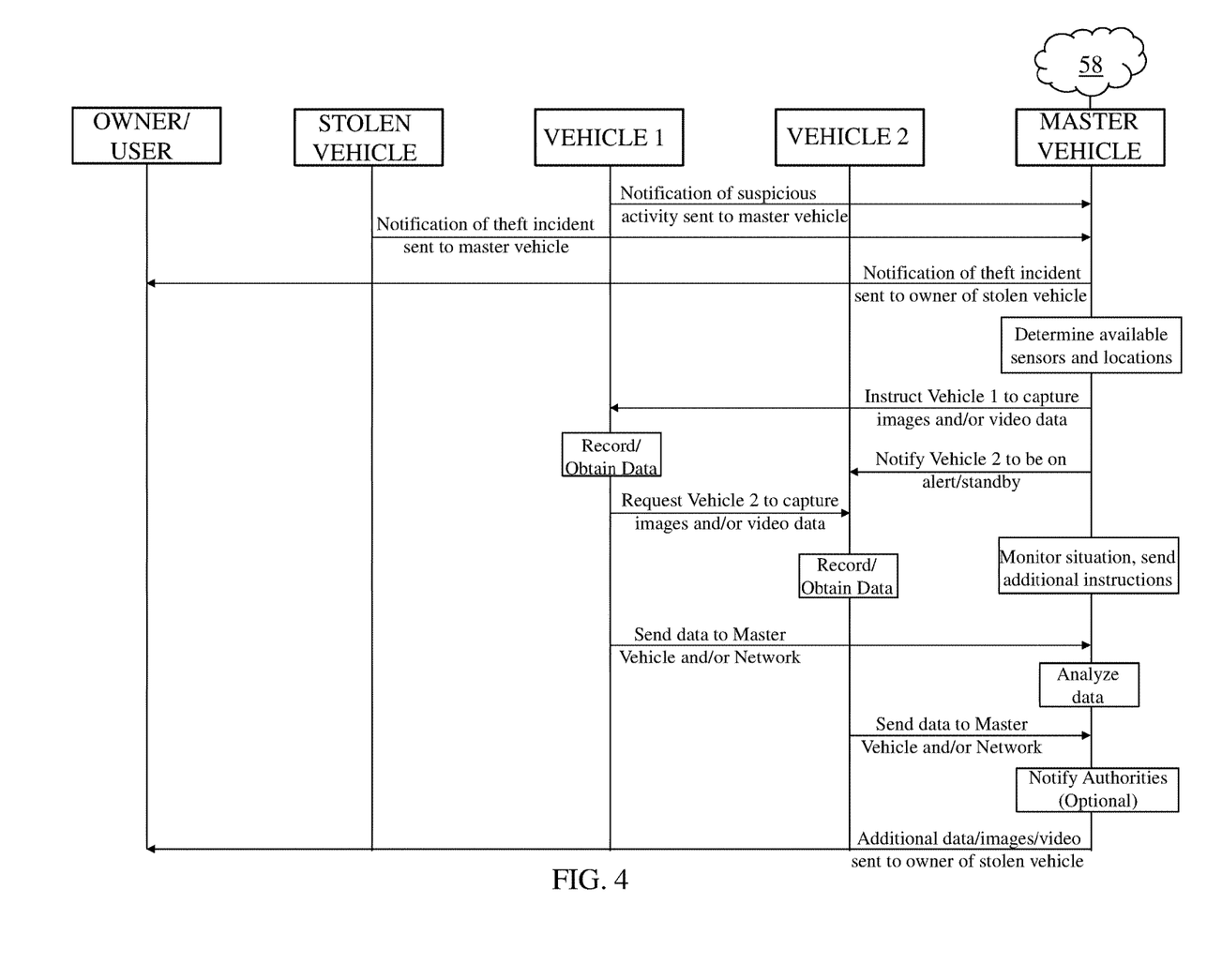
FIG. 4 illustrates a schematic view of exemplary communications and instructions that can be made between different vehicles and systems as provided in FIGS. 1-3.

FIG. 4 illustrates a schematic view of exemplary communications and instructions that can be made between different vehicles and systems as provided in FIGS. 1-3 and discussed herein. It should be understood that the various instructions and responses from systems and vehicles are only exemplary in nature, and various modifications are within the scope of the present technology.

It should further be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an application-specific integrated circuit (ASIC), a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. A module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A coordinated system of monitoring a group of vehicles for suspicious activity, the system comprising:
   a network in communication with a plurality of vehicles and configured to monitor and detect evidence of theft or unauthorized intrusion using existing theft detection sensors located in the plurality of vehicles, with one of the plurality of vehicles being designated as a master vehicle responsible for managing at least one control feature in the coordinated system;
   at least one processor operably connected to the network and the master vehicle;

a memory device operably connected to the at least one processor;

the memory device comprising a detection module having instructions that, when executed by the at least one processor, cause the at least one processor to obtain at least one input from at least one theft detection sensor of the plurality of vehicles;

the memory device comprising a theft determination module having instructions that, when executed by the at least one processor, cause the at least one processor to:

analyze the input from the at least one theft detection sensor for suspicious information;

determine that the input represents or contains evidence indicative of a theft or unauthorized intrusion into one of the plurality of vehicles; and the memory device comprising a communication module having instructions that, when executed by the at least one processor, cause the at least one processor to:

upon receiving a notification indicative of a theft or unauthorized intrusion from the theft determination module, provide a communication to at least one of another vehicle, a vehicle owner, and the network, with the communication indicating that one of the plurality of vehicles may have been subjected to a theft or unauthorized intrusion.

2. The coordinated system according to claim 1, wherein the detection module has further instructions that, when executed by the at least one processor, cause the at least one processor to obtain information indicating different types of sensors available from each of the plurality of vehicles.

3. The coordinated system according to claim 2, wherein the master vehicle coordinates the monitoring based on the different types of sensors available from each of the plurality of vehicles.

4. The coordinated system according to claim 1, wherein the detection module has further instructions that, when executed by the at least one processor, cause the at least one processor to capture image data from the plurality of vehicles based on a monitoring schedule.

5. The coordinated system according to claim 4, wherein the monitoring schedule is controlled by the master vehicle.

6. The coordinated system according to claim 4, wherein the monitoring schedule is based on at least one of a size of a monitoring area, a monitoring pattern, and a total of vehicles in the plurality of vehicles.

7. The coordinated system according to claim 1, wherein the master vehicle coordinates operations of the theft detection sensors from the plurality of vehicles.

8. The coordinated system according to claim 1, wherein a designation of one of the plurality of vehicles as the master vehicle changes based on a monitoring schedule.

9. The coordinated system according to claim 1, wherein a designation of one of the plurality of vehicles as the master vehicle is made remotely or based on communication between the plurality of vehicles.

10. The coordinated system according to claim 1, wherein at least one of the plurality of vehicles is without sensors or is unable to contribute to monitoring, and provides a compensation to participate in the coordinated system.

11. The coordinated system according to claim 1, wherein the master vehicle receives a compensation for managing the monitoring in the coordinated system.

12. The coordinated system according to claim 1, wherein the at least one theft detection sensor is a camera or a sensor of: a vehicle theft detection system, an advanced driving assistance system, or an additional camera or sensor.

13. The coordinated system according to claim 1, wherein the communication provided by the communication module includes at least one of a map and GPS coordinates indicating a location of the theft or unauthorized intrusion.

14. The coordinated system according to claim 1, wherein the communication provided by the communication module includes at least one of a still image, a live stream video, and a video clip.

15. A computer-implemented method of monitoring a group of vehicles for suspicious activity, the method comprising:

grouping a plurality of vehicles in communication with a network to collectively monitor and detect evidence of theft or unauthorized intrusion using existing theft detection sensors located in the plurality of vehicles;

designating one of the plurality of vehicles as a master vehicle responsible for managing at least one control feature;

operably connecting the master vehicle with the network and at least one processor wherein the master vehicle coordinates the monitoring based on different types of sensors available from each of the plurality of vehicles;

obtaining at least one input from at least one theft detection sensor of the plurality of vehicles;

analyzing the input from the at least one theft detection sensor for suspicious information;

determining that the input represents or contains evidence indicative of a theft or unauthorized intrusion into one of the plurality of vehicles; and providing a communication to at least one of another vehicle, a vehicle owner, and the network, with the communication indicating that one of the plurality of vehicles may have been subjected to a theft or unauthorized intrusion.

16. The computer-implemented method according to claim 15, comprising capturing image data from each of the plurality of vehicles based on at least one of a monitoring schedule, a monitoring area, and a monitoring pattern as determined by the master vehicle.

17. The computer-implemented method according to claim 15, wherein the step of designating one of the plurality of vehicles as the master vehicle is made remotely or based on communication between the plurality of vehicles.

18. A non-transitory computer-readable medium for monitoring a group of vehicles for suspicious activity and including instructions that, when executed by one or more processors, cause the one or more processors to:

group a plurality of vehicles in communication with a network to collectively monitor and detect evidence of theft or unauthorized intrusion using existing theft detection sensors located in the plurality of vehicles;

designate one of the plurality of vehicles as a master vehicle responsible for managing at least one control feature;

operably connect the master vehicle with the network and at least one processor wherein the master vehicle coordinates the monitoring based on different types of sensors available from each of the plurality of vehicles;

obtain at least one input from at least one theft detection sensor of the plurality of vehicles;

analyze the input from the at least one theft detection sensor for suspicious information;

determine that the input represents or contains evidence indicative of a theft or unauthorized intrusion into one of the plurality of vehicles; and provide a communication to at least one of another vehicle, a vehicle owner, and the network, with the communication indicating that one of the plurality of vehicles may have been subjected to a theft or unauthorized intrusion.

19. The non-transitory computer-readable medium according to claim 18, wherein the non-transitory computer-readable medium further comprises instructions to capture image data from each of the plurality of vehicles based on at least one of a monitoring schedule, a monitoring area, and a monitoring pattern as determined by the master vehicle.

* * * * *

UNITED STATES PATENT AND TRADEMARK OFFICE
CERTIFICATE OF CORRECTION

Page 1 of 1

PATENT NO.        : 10,967,833 B1
APPLICATION NO.   : 16/843311
DATED             : April 6, 2021
INVENTOR(S)       : Satoshi Nagao et al.

It is certified that error appears in the above-identified patent and that said Letters Patent is hereby corrected as shown below:

In the Claims

Claim 15, Column 14, Line 20: delete "at least one processor" and insert -- at least one processor, --

Claim 18, Column 14, Line 56: delete "at least one processor" and insert -- at least one processor, --

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*